United States Patent [19]

Pedersen et al.

[11] 4,427,792

[45] Jan. 24, 1984

[54] IRON-PHOSPHORUS MIXED OXIDE CATALYSTS AND PROCESS FOR THEIR PREPARATION

[75] Inventors: S. Erik Pedersen, Mentor; Noel J. Bremer, Stow; James L. Callahan, Wooster, all of Ohio

[73] Assignee: The Standard Oil Company, Cleveland, Ohio

[21] Appl. No.: 291,603

[22] Filed: Aug. 10, 1981

[51] Int. Cl.³ .................................................. B01J 27/18
[52] U.S. Cl. .................................. 502/210; 502/213; 560/214
[58] Field of Search .................. 252/432, 435, 437; 560/214

[56] References Cited

U.S. PATENT DOCUMENTS

| | | | |
|---|---|---|---|
| 3,207,806 | 9/1965 | Bajars | 560/214 X |
| 3,870,764 | 3/1975 | Gichowski et al. | 252/437 X |
| 4,108,874 | 8/1978 | Moriya et al. | 252/437 X |
| 4,179,404 | 12/1979 | Barone | 252/437 X |
| 4,283,288 | 8/1981 | Udovich et al. | 252/437 |

*Primary Examiner*—W. J. Shine
*Attorney, Agent, or Firm*—Joseph G. Curatolo; Larry W. Evans

[57] ABSTRACT

A process is provided for the preparation of iron phosphorous mixed oxide catalysts which are highly active at moderate temperatures by introducing iron and phosphorus containing compounds and promoter element containing compounds, if any, into a substantially organic liquid medium, heating, separating the resulting precursor, drying and calcining. The catalysts are useful for the dehydrogenation or oxydehydrogenation of organic compounds such as aldehydes or carboxylic acids.

17 Claims, No Drawings

IRON-PHOSPHORUS MIXED OXIDE CATALYSTS AND PROCESS FOR THEIR PREPARATION

BACKGROUND OF THE INVENTION

This invention relates to the preparation of iron phosphorus oxide catalysts useful for the oxidative dehydrogenation of organic compounds, such as for the preparation of unsaturated aldehydes and carboxylic acids from their corresponding saturated aldehydes and carboxylic acids.

More particularly, the present invention is directed to the preparation of highly active iron phosphorus mixed oxide catalysts in organic media, and the use of these catalysts for the oxydehydrogenation of aldehydes and acids, such as isobutyraldehyde to methacrolein and isobutyric acid to methacrylic acid.

Iron phosphorus oxide catalysts have been conventionally prepared by mixing and reacting compounds of the catalyst components in water, such as is disclosed in U.S. Pat. No. 3,948,959.

The dehydrogenation of aldehydes in the presence of at least two halogens and an inorganic catalyst which may comprise an alkali metal oxide or hydroxide or alkaline earth metal oxide or hydroxide and a metal compound such as iron phosphate, among others, is disclosed in U.S. Pat. No. 3,207,806.

The production of unsaturated carboxylic acids from their corresponding saturated acids using iron phosphorus oxide catalysts, with or without various promoters, is also disclosed in the art. U.S. Pat. No. 3,948,959 discloses the preparation of unsaturated acids by oxidation of the corresponding saturated acids using iron phosphorus oxide catalysts promoted with Li, Na, K, Rb, Cs, Mg, Ca, Sr and Ba. U.S. Pat. Nos. 3,634,494; 3,652,654; 3,855,279; 3,917,673 and 4,029,695 disclose the preparation of unsaturated acids and esters from saturated acids and esters using iron phosphorus oxide catalysts, containing bismuth and/or lead promoters, optionally with other promoter elements, including Mn, U, Pr, Ca, Sr, and Cr. These prior art catalysts characteristically have exhibited short life and thermal instability.

U.S. Pat. No. 4,244,879 discloses the preparation of vanadium phosphorus mixed oxide catalysts in organic media suitable for the reduction of vanadium from the +5 valence state to the +4 state.

It is therefore an object of the present invention to provide a process for the production of iron phosphorus mixed oxide catalysts, suitable for the oxydehydrogenation of saturated aldehydes and carboxylic acids, among other organic compounds, which exhibit high activity at moderate temperatures, extending catalyst life.

SUMMARY OF THE INVENTION

We have found that the preparation of iron phosphorus oxide catalysts in liquid organic media such as alcohols, glycols, and the like, results in highly active catalysts for oxydehydrogenation of saturated organic compounds, particularly aldehydes and carboxylic acids. This high activity is demonstrated as the performance of the catalysts at moderate temperatures in effecting high conversions of the saturated organic compounds to the desired product with excellent selectivity.

The ability of these catalysts to operate efficiently at moderate temperature enhances catalyst life by retarding thermal degradation, and further permits operating plant economics by lowering utility requirements and cost. Although various promoters and combinations of promoters have been discovered which enhance the activity of iron phosphorus mixed oxide catalysts, as disclosed in U.S. Ser. No. 221,859 assigned to our common Assignee herein, the method of preparation of the present invention increases the activity of even unpromoted iron phosphorus mixed oxide catalysts to permit high conversion operation at reduced temperature.

In general, the present invention includes a process for the preparation of iron phosphorus mixed oxide catalysts comprising introducing an iron-containing compound, a phosphorus-containing compound, and promoter element-containing compounds, if any, into a substantially organic liquid media, preferably selected from alcohols and glycols to form a reaction mixture; heating the reaction mixture to form an iron phosphorus mixed oxide catalyst precursor; separating the catalyst precursor from the reaction mixture; drying the catalyst precursor; and, calcining the precursor.

The present invention additionally include a process for the oxydehydrogenation of saturated organic compounds, particularly aldehydes and carboxylic acids by contacting the saturated organic compounds with molecular oxygen or an oxygen-containing gas in the vapor phase at a reaction temperature of about 250° C. to about 600° C. in the presence of an iron phosphorus mixed oxide catalyst prepared according to the above method.

DETAILED DESCRIPTION OF THE INVENTION

According to the process of the present invention, compounds containing the catalyst components are introduced into a substantially organic liquid medium. Preferably, the compounds utilized are soluble in the organic liquid.

Suitable iron and promoter element containing compounds include but are not limited to the corresponding metal oxides, hydroxides, nitrates, sulfates, halides, carbonates, oxyhalides, nitrites and salts of organic acids such as formates, acetates, oxalates, and the like. Suitable phosphorus compounds include but are not limited to the phosphoric acids such as orthophosphoric acid, phosphorous acid, phosphorus halide, ammonium phosphate, phosphorus oxides and the like. The catalyst component compounds may be soluble in the organic liquid medium utilized, or may form a suspension or slurry.

The organic liquid suitable for use in the process of the present invention is a liquid at ordinary room temperature, and includes but is not limited to alcohols such as ethanol, propanol, isobutanol and the like, glycols such as ethylene glycol, aldehydes such as isobutyraldehyde, polyols such as glycerol, ketones such as diethylketone, and the like. Preferably the organic liquid is selected from alcohols having from 2 to about 12 carbon atoms. The organic liquid medium preferably contains only minor amounts of water, less than 5 volume % and is most preferably anhydrous.

The reaction mixture which is formed by the introduction of the catalyst component compounds is heated, preferably under reflux conditions. Water which is formed by reaction of the compounds may be removed by methods known in the art, such as by utilizing a Dean and Stark receiver or its equivalent.

The catalyst precursor which is formed by reaction of the catalyst component-containing compounds is separated from the reaction mixture by conventional methods such as filtration, centrifugation, and/or evaporation. The catalyst precursor is then dried, preferably at a temperature of about 80° C. to about 200° C. The catalyst precursor is then calcined at a temperature of about 300° C. to about 700° C.

The catalyst may be formed into tablets, pellets and the like, and may be prepared for use in either fixed or fluid beds. The catalyst may be combined with inert diluents such as silica. Alternately, the catalyst may be coated upon inert supports, such as silica, alumina, alumina-silica, silicon carbide, titania, zirconia, zeolites and clays such as kieselguhr. Techniques of coating are included in U.S. Pat. No. 4,077,912. The inert supports preferably are of at least about 20 microns in diameter.

The preparation of iron phosphorus mixed oxide catalysts in substantially organic liquid media as set forth above provides catalysts which exhibit high activity at moderate temperatures for the dehydrogenation or oxydehydrogenation of organic compounds, whereas iron phosphorus oxide catalysts prepared in aqueous media require higher operating temperatures to achieve that level of activity. Operation at more moderate temperatures extends catalyst life and provides operating (utility) economics.

In addition to its applicability to unpromoted iron phosphorus mixed oxide catalysts, the process of the present invention is also applicable to promoted iron phosphorus oxide catalysts.

Promoted iron phosphorus mixed oxide catalysts which are prepared according to the process of the present invention may be represented by the following empirical formula:

$$A_aFe_bP_cO_x$$

wherein

A is selected from the group Ag, Al, B, Be, Cd, Co, Cr, Cu, Ga, Ge, In, Mn, Ni, Te, Th, Ti, Tl, U, Zn, Zr, alkali metals, alkaline earth metals, rare earths and mixtures thereof, and wherein a is about 0.01 to about 2.0
b is about 0.5 to about 2.0
C is about 1.0 to about 3.5
and x is the number of oxygens needed to satisfy the valence requirements of the remaining elements.

Preferably a equals about 0.15 to 1.5. Also, preferably b is about 1, and c is about 1.5 to 2.

Preferred rare earth metal promoters include La, Ce, Nd, Sm, Eu, Dy, Ho, Tm, Yb and Lu.

Preferred promoters include Ag, Cs, Mn, Th, Tl and U.

Iron phosphorus mixed oxide containing catalysts prepared according to the process of the present invention are useful for the dehydrogenation or oxydehydrogenation of organic compounds, having at least one —$CH_2$—$CH_2$— group such as saturated carboxylic acids, saturated aldehydes, nitriles, amines, amides, alcohols, alkanes, alkenes, ethers, esters, ketones, and the like. Illustrations of such oxydehydrogenation reactions include but are not limited to propionic acid to acrylic acid, isobutyric acid to methacrylic acid, isobutyraldehyde to methacrolein, propionaldehyde to acrolein, propionitrile to acrylonitrile, butyramide to crotonamide, n-propanol to allyl alcohol, propane to propene, butene to butadiene, methyl ethyl ketone to methyl vinyl ketone, methylisobutyrate to methylmethacrylate, and methoxybutane to methoxybutene.

The iron phosphorus mixed oxide containing catalysts prepared according to the process of the present invention are particularly suitable for the oxydehydrogenation of saturated aldehydes of the formula $$R_1-\underset{R_2}{\underset{|}{CH}}-\underset{R_3}{\underset{|}{CH}}-\underset{O}{\underset{\|}{C}}-H$$

and saturated carboxylic acids of the formula $$R_1-\underset{R_2}{\underset{|}{CH}}-\underset{R_3}{\underset{|}{CH}}-\underset{O}{\underset{\|}{C}}-OH$$

wherein $R_1$, $R_2$, and $R_3$ are each independently selected from the group consisting of hydrogen and alkyl groups containing 1 to 4 carbon atoms. The aldehydes or acids may contain other functional groups such as hydrocarboxyl- aryl groups or nitrile groups, provided the functional groups do not interfere with the dehydrogenation reaction, under the reaction conditions required. The dehydrogenation occurs essentially in the alpha, beta position.

The saturated aldehydes or acids are contacted with the catalyst in the vapor phase, together with molecular oxygen. The molecular oxygen is most conveniently added as air, but synthetic streams containing oxygen are also suitable. In addition to the aldehyde or carboxylic acid feed and molecular oxygen, other gases may be added to the reactant feed. For example, steam is preferably added to the reactant feed to aid in the reaction, although the mechanism by which it does so is not certain. Inert diluents such as nitrogen, carbon monoxide, carbon dioxide and argon may also be added.

The molar ratio of the reactants may vary widely and are not critical. The ratios of aldehyde or carboxylic acid: air: steam are in the range of 1:2.5–50:0–50 and are preferably 1:3–10:10–30. Diluents may be present in the range of 0–40 moles per mole of aldehyde or carboxylic acid.

The reaction temperature may vary widely and is partially dependent upon the particular aldehyde or carboxylic acid and catalyst employed as well as the level of conversion desired. Temperatures of about 250° to 600° C. may be employed with temperatures of 325°–425° C. being preferred. Operation at high temperatures is possible, but the preparation of the catalyst according to the process of the present invention permits operation at moderate temperature to provide high conversions in addition to catalyst life.

The contact time may vary from a fraction of a second to about 50 seconds. In fixed bed reactions the contact time is preferably about 0.5 seconds to about 10 seconds, for fluid bed, preferably from about 2 seconds to about 20 seconds. The reaction may be conducted at atmospheric, superatmospheric or subatmospheric pressure, preferably from about 1 psia to about 100 psia, most preferably between 10 to about 30 psia.

SPECIFIC EMBODIMENTS OF THE INVENTION

Examples 1 and 2

Catalysts of the formula $FePO_x$ were prepared by suspending 25.0 g FeOCl in about 500 ml isobutanol. To this suspension was added 22.83 g $H_3PO_4$ (100%) and the resulting reaction mixture was refluxed for about 16 hours, utilizing a Dean & Stark receiver. After cooling, the catalyst precursor was recovered by filtration, dried for about 16 hours at about 110° C. and calcined at about 540° C. for about 2 hours. The resulting catalyst was crushed and screened to 14–30 mesh (0.595–1.41 mm).

These catalysts and those prepared according to the examples below were tested for the oxydehydrogenation of isobutyric acid to methacrylic acid in a 20 cc fixed bed reactor. The reactor consisted of a length of stainless steel tubing having an outer diameter of about 1.3 cm, and containing a full length 0.31 cm diameter axial thermowell. The reactor was heated with a split stainless steel block furnace.

The isobutyric acid was fed to the reactor by passing air through a saturator filled with isobutyric acid and maintained at a temperature of 108° C. Water was fed by means of a tubing pump and vaporized in a compartment maintained at about 154° C. before entering the reactor. Liquid and gaseous products were analyzed by gas chromatography.

The test reactions were run at atmospheric pressure. Reaction conditions such as temperature, feed ratios, and contact time are listed in the Table below. Results of the tests reported in the Table below are reported in terms as follows:

$$\text{Single Pass Yield} = \frac{\text{Moles of Methacrylic Acid Formed} \times 100}{\text{Moles of Isobutyric Acid Fed}}$$

$$\text{Total Conversion} = \frac{\text{Moles of Isobutyric Acid Reacted} \times 100}{\text{Moles of Isobutyric Acid Fed}}$$

$$\text{Selectivity} = \frac{\text{Single Pass Yield} \times 100}{\text{Total Conversion}}$$

EXAMPLES 3 & 4

Catalysts of the formula $FeP_{1.0}O_x$ were prepared by introducing 25.0 g $Fe(OH)(O_2CCH_3)_2$ and 12.83 g $H_3PO_4$(100%) in 500 ml isobutanol, and refluxing the resulting reaction mixture with vigorous stirring for about 24 hours, collecting water which was produced in the reaction in a Dean and Stark receiver. The catalyst precursor was recovered by filtration, was dried at 110° C. for about 16 hours and was calcined at 540° C. for 2 hours. The catalyst was crushed and screened to 14–30 mesh, and was tested for the oxydehydrogenation of isobutyric acid as set forth in Examples 1 and 2. Test conditions and results are reported in the Table below.

Comparative Examples 5 and 6

Catalysts of the formula $FeP_{1.84}O_x$ were prepared in aqueous media by dissolving 121.25 g $Fe(NO_3)_3 \cdot 9H_2O$ and 63.50 g $H_3PO_4$ (85%) in about 300 ml $H_2O$. The solution was heated and evaporated to a dry paste. The paste was dried for about 16 hours at 110° C., and the resulting solid was calcined at 540° C. for 2 hours. The catalyst was crushed and screened to 14–30 mesh, and was tested for the oxydehydrogenation of isobutyric acid according to the procedure set forth in Examples 1 and 2. Test conditions and results are reported in the Table below.

As is demonstrated by the test results for Examples 1 through 6, iron phosphorus mixed oxide catalysts prepared in organic liquid media exhibit higher activity for the oxydehydrogenation of organic compounds, such as demonstrated for isobutyric acid, in terms of both conversion and selectivity (and thus yield) as compared to the iron phosphorus mixed oxide catalysts prepared in aqueous media. The organic media derived catalysts of the present invention additionally exhibit their enhanced activity at significantly lower operating temperatures than comparable catalysts derived in aqueous media.

Examples 7–9

Catalysts of the formula $Mn_{0.5}FeP_{1.84}O_x$ were prepared by adding 121.25 g $Fe(NO_3)_3 \cdot 9H_2O$, 53.70 g $Mn(NO_3)_2$ (50%) and 54.12 g $H_3PO_4$ (100%) in 500 ml isobutanol. The resulting reaction mixture was processed to produce the catalysts according to the procedure of Examples 3 and 4. The catalysts were tested for isobutyric acid oxydehydrogenation according to the procedure set forth in Examples 1 and 2. Test conditions and results are reported in the Table below.

Comparative Example 10

A catalyst of the formula $Mn_{0.5}FeP_{1.84}O_x$ was prepared according to the procedure of Comparative Examples 5 and 6, except that additionally 53.71 g $Mn(NO_3)_2$ (50%) was added to the reaction medium. This catalyst was tested for isobutyric acid oxydehydrogenation by the procedure of Examples 1 and 2. Test conditions and results are reported in the Table below.

Example 11

A catalyst of the formula $Mn_{0.5}FeP_{1.84}O_x$ was prepared according to the procedure of Examples 7–9, except that the catalyst component containing compounds utilized were 19.30 g $Fe_3O_4$, 45.08 g $H_3PO_4$ and 44.74 g $Mn(NO_3)_2$(50%). The catalyst was tested for isobutyric acid oxydehydrogenation by the procedure of Examples 1 and 2, test conditions and results being reported in the table below.

Examples 12–14

Catalysts of the formula $Ag_{0.8}FeP_{1.84}O_x$ were prepared according to the procedure of Examples 7–9, except that 40.78 $AgNO_3$ was substituted for the manganese compound of those examples. Additionally, the powdery catalyst material formed was tabletted at 4000 psig prior to being crushed and screened to 14–30 mesh. These catalysts were tested for isobutyric acid oxydehydrogenation by the procedure of Examples 1 and 2, the test conditions and results reported in the Table below.

Comparative Example 15

A catalyst of the formula $Ag_{0.8}FeP_{1.84}O_x$ was prepared according to the procedure of Comparative Example 10, except that 40.78 g $AgNO_3$ was substituted for the manganese compound. The catalyst was tested for isobutyric oxydehydrogenation by the procedure of Examples 1 and 2, test conditions and results being reported in the Table below.

As is demonstrated by the test results reported in the Table, the preparation of iron phosphorus mixed oxide containing catalysts in organic liquid media, according to the process of the present invention, results in the production of catalysts suitable for the oxydehydrogenation of organic compounds. The catalysts so produced exhibit high activity, exhibiting high conversion to unsaturated product with high selectivity at moderate temperatures. The high activity is further exhibited by these catalysts at temperatures below those required for satisfactory operation of aqueous media-derived iron phosphorus mixed oxide catalysts. Moderate temperature operation of the organic liquid-derived iron phosphorus mixed oxide catalysts results in longer catalyst life.

Other phosphorus mixed oxide-containing catalysts which may be prepared by the process of the present invention include but are not limited to the following.

| | |
|---|---|
| $Cu_{0.66}FeP_{1.84}O_x$ | $Ag_{0.8}Fe_{1.2}P_{1.84}O_x$ |
| $Th_{0.2}FeP_{1.84}O_x$ | $Ag_{1.0}FeP_{1.84}O_x$ |
| $Ce_{0.2}FeP_{1.84}O_x$ | $Cs_{0.2}FeP_2O_x$ |
| $Co_{0.33}FeP_{1.84}O_x$ | $Mg_{0.1}FeP_2O_x$ |
| $La_{0.22}FeP_{1.84}O_x$ | $Ti_{0.2}FeP_{1.84}O_x$ |
| $Cr_{0.22}FeP_{1.84}O_x$ | $Ni_{0.33}FeP_{1.84}O_x$ |
| $Zn_{0.33}FeP_{1.84}O_x$ | $Tl_{0.25}FePO_x$ |
| $Ge_{0.2}FeP_{1.84}O_x$ | $Eu_{0.22}FeP_{1.84}O_x$ |
| $U_{0.3}FeP_{1.84}O_x$ | $Nd_{0.22}FeP_{1.84}O_x$ |
| $Ag_{0.4}Mn_{0.4}FeP_{1.84}O_x$ | $Ag_{0.5}U_{0.3}FeP_{1.84}O_x$ |

The enhancement of activity of the organic liquid derived iron phosphorus mixed oxide catalysts over aqueous derived catalysts is accompanied by very slight or no increase in catalyst intrinsic surface area. Also, there has been no reduction in valence detected in the iron-phosphorus mixed oxide system.

Thus it should be apparent to those skilled in the art that the subject invention accomplishes the objects set forth above. It is to be understood that the subject invention is not to be limited by the examples set forth herein. These have been provided merely to demonstrate operability, and the selection of iron and phosphorus-containing compounds, promoter element-containing compounds, organic liquid media, reaction feedstocks and reaction conditions can be determined from the total specification disclosure provided without departing from the spirit of the invention herein disclosed and described, the scope of the invention including equivalent embodiments, modifications and variations that fall within the scope of the attached claims.

separating the catalyst precursor from the reaction mixture;
drying the catalyst precursor; and
calcining the precursor.

2. A process as in claim 1 wherein at least one promoter element containing compound is introduced into said organic liquid, wherein the promoter element is selected from the group consisting of Ag, Be, Cd, Co, Cr, Cu, Ge, Mn, Ni, Te, Th, Ti, U, Zn, Zr, alkali metals, alkaline earth metals, rare earths and mixtures thereof.

3. A process as in claim 1 wherein said organic liquid comprises an alcohol having from 2 to about 12 carbon atoms.

4. A process as in claim 3 wherein said organic liquid is selected from ethanol, isopropanol, and isobutanol.

5. A process as in claim 1 wherein said organic liquid is essentially anhydrous.

6. A process as in claim 1 wherein said reaction mixture is heated under reflux conditions.

7. A process as in claim 2 wherein said iron phosphorus mixed oxide catalyst contains at least one promoter element and is represented by the formula:

$$A_a Fe_b P_c O_x$$

wherein
A is selected from the group Ag, Be, Cd, Co, Cr, Cu, Ge, Mn, Ni, Te, Th, Ti, U, Zn, Zr, alkali metals, alkaline earth metals, rare earths and mixtures thereof,
and wherein
a is about 0.01 to about 2.0
b is about 0.5 to about 2.0
c is about 1.0 to about 3.5
and x is the number of oxygens needed to satisfy the valence requirements of the remaining elements.

8. A process as in claim 1, wherein said catalyst is suitable for the dehydrogenation or oxydehydrogenation of organic compounds having at least one —CH$_2$—CH$_2$— group.

TABLE

OXYDEHYDROGENATION OF ISOBUTYRIC ACID

| Example No. | Catalyst | Feed Ratio IBA/AIR/H$_2$O | Bath Temp. °C. | Contact Time (Sec.) | % Conversion | Methacrylic Acid | |
|---|---|---|---|---|---|---|---|
| | | | | | | % Yield | % Selectivity |
| 1 | FePO$_x$ | 1/4.5/25 | 369 | 1 | 96.4 | 73.4 | 76.2 |
| 2 | FePO$_x$ | 1/4.7/25 | 375 | 1 | 97.1 | 70.6 | 72.7 |
| 3 | FePO$_x$ | 1/4.6/25 | 403 | 1 | 99.2 | 69.4 | 69.9 |
| 4 | FePO$_x$ | 1/4/25 | 363 | 1.1 | 96.7 | 72.9 | 75.4 |
| C5 | FeP$_{1.84}$O$_x$ | 1/4/23 | 426 | 1.6 | 88.2 | 58.9 | 66.8 |
| C6 | FeP$_{1.84}$O$_x$ | 1/4/23 | 434 | 1.6 | 87.4 | 58.1 | 66.5 |
| 7 | Mn$_{0.5}$FeP$_{1.84}$O$_x$ | 1/4.6/25 | 379 | 1.0 | 99.3 | 73.1 | 73.6 |
| 8 | Mn$_{0.5}$FeP$_{1.84}$O$_x$ | 1/4/25 | 361 | 1.0 | 98.2 | 74.7 | 76.1 |
| 9 | Mn$_{0.5}$FeP$_{1.84}$O$_x$ | 1/4.5/25 | 349 | 1.0 | 99.5 | 71.3 | 71.7 |
| C10 | Mn$_{0.5}$FeP$_{1.84}$O$_x$ | 1/4.2/26 | 376 | 1.0 | 99.3 | 71.4 | 71.9 |
| 11 | Mn$_{0.5}$FeP$_{1.84}$O$_x$ | 1/4/25 | 367 | 1.0 | 95.7 | 73.1 | 76.3 |
| 12 | Ag$_{0.8}$FeP$_{1.84}$O$_x$ | 1/4.3/25 | 363 | 1 | 95.9 | 72.7 | 75.8 |
| 13 | Ag$_{0.8}$FeP$_{1.84}$O$_x$ | 1/4.3/32 | 359 | 0.8 | 97.3 | 73.6 | 75.6 |
| 14 | Ag$_{0.8}$FeP$_{1.84}$O$_x$ | 1/4/32 | 360 | 0.8 | 95 | 73.3 | 77.1 |
| C15 | Ag$_{0.8}$FeP$_{1.84}$O$_x$ | 1/4.7/25 | 394 | 1.0 | 97.1 | 71.0 | 73.1 |

We claim:

1. A process for the preparation of iron phosphorus mixed oxide catalysts consisting essentially of
introducing an iron-containing compound and a phosphorus containing compound into a substantially organic liquid selected from alcohols and glycols to form a reaction mixture;
heating the reaction mixture to form an iron-phosphorus oxide catalyst precursor;

9. A catalyst containing the mixed oxides of iron and phosphorus prepared by the process consisting essentially of
introducing an iron-containing compound and a phosphorus containing compound into a substantially organic liquid selected from alcohols and glycols to form a reaction mixture;
heating the reaction mixture to form an iron-phosphorus oxide catalyst precursor;

separating the catalyst precursor from the reaction mixture;

drying the catalyst precursor; and calcining the precursor.

10. A catalyst as in claim 9 wherein at least one promoter element containing compound is introduced into said organic liquid, wherein the promoter element is selected from the group consisting of Ag, Be, Cd, Co, Cr, Cu, Ge, Mn, Ni, Te, Th, Ti, U, Zn, Zr, alkali metals, alkaline earth metals, rare earths and mixtures thereof.

11. A catalyst as in claim 9 wherein said organic liquid comprises an alcohol having from 2 to about 12 carbon atoms.

12. A catalyst as in claim 11 wherein said organic liquid is selected from ethanol, isopropanol, and isobutanol.

13. A catalyst as in claim 9 wherein said organic liquid is essentially anhydrous.

14. A catalyst as in claim 9 wherein said reaction mixture is heated under reflux conditions.

15. A catalyst as in claim 10 wherein said iron phosphorus mixed oxide containing catalyst contains at least one promoter element and is represented by the formula:

$$A_a Fe_b P_c O_x$$

wherein

A is selected from the group Ag, Be, Cd, Co, Cr, Cu, Ge, Mn, Ni, Te, Th, Ti, U, Zn, Zr, alkali metals, alkaline earth metals, rare earths and mixtures thereof, and wherein a is about 0.01 to about 2 b is about 0.5 to about 2 c is about 1 to about 3.5 and x is the number of oxygens needed to satisfy the valence requirements of the remaining elements.

16. The process of claim 1 wherein the organic liquid contains less than 5 volume percent water.

17. The catalyst of claim 9 wherein the organic liquid contains less than 5 volume percent water.

* * * * *